US012748583B2

(12) United States Patent
Lin et al.

(10) Patent No.: US 12,748,583 B2
(45) Date of Patent: Sep. 29, 2026

(54) AUTOMOTIVE SECURITY CONFIGURATION MANAGEMENT

(71) Applicant: Fortinet, Inc., Sunnyvale, CA (US)

(72) Inventors: Chengyong Lin, San Jose, CA (US); Feng Yan, Fremont, CA (US); Langtian Du, Saratoga, CA (US); Masanori Bando, Santa Clara, CA (US); Hauwei Yu, Fremont, CA (US)

(73) Assignee: Fortinet, Inc., Sunnyvale, CA (US)

( * ) Notice: Subject to any disclaimer, the term of this patent is extended or adjusted under 35 U.S.C. 154(b) by 201 days.

(21) Appl. No.: 18/401,549

(22) Filed: Dec. 31, 2023

(65) Prior Publication Data

US 2025/0217128 A1 Jul. 3, 2025

(51) Int. Cl.
*G06F 8/65* (2018.01)
*H04L 9/32* (2006.01)

(52) U.S. Cl.
CPC .............. *G06F 8/65* (2013.01); *H04L 9/3263* (2013.01)

(58) Field of Classification Search
CPC ..................................... G06F 8/65; G06F 8/71
See application file for complete search history.

(56) References Cited

U.S. PATENT DOCUMENTS

| | | | | |
|---|---|---|---|---|
| 10,447,483 | B1 * | 10/2019 | Su | H04L 9/3226 |
| 2015/0215274 | A1 * | 7/2015 | Imadali | H04L 61/5007 709/245 |
| 2016/0266885 | A1 * | 9/2016 | Aleksandrov | G06F 8/65 |
| 2020/0057872 | A1 * | 2/2020 | Ingraham | H04L 9/085 |
| 2024/0053974 | A1 * | 2/2024 | Cardillo | G06F 8/71 |
| 2024/0104217 | A1 * | 3/2024 | Jung | G06F 21/572 |

* cited by examiner

*Primary Examiner* — Duy Khuong T Nguyen
(74) *Attorney, Agent, or Firm* — Law Office of Dorian Cartwright; Dorian Cartwright

(57) ABSTRACT

A request to check for updated configuration files for a specific automobile and a specific automobile type is received in real-time over the data communication network. A checksum of received request is compared against stored configuration file, checks for an update. If there is an update, a signature is generated using the certificate from the unique VIN number portion and the stored configuration file for encrypting the stored configuration file. The signature and stored configuration file are transmitted to the specific automobile for local configuration update.

3 Claims, 6 Drawing Sheets

AUTOMOTIVE SECURITY CONFIGURATION MANAGEMENT

FIELD OF THE INVENTION

The invention relates generally to computer networks, and more specifically, for securely updating computer configuration files of a specific automobile type and a specific automobile.

BACKGROUND

The automobile industry is undergoing tremendous changes, such as forms of mobile computing for different services. Some computing services concern the automobile (e.g., configuration files) while others concern individuals riding in the automobile (e.g., Spotify).

Network security for the services can be critical for the personal safety of drivers and passengers. For example, malicious actors can make configuration changes intentionally and non-malicious actors can make configuration changes unintentionally, that harmfully affect computer vision systems to misinterpret video feeds. In another example, an incorrect configuration file may be sent in error due to many different manufacturers of cars and different models by each manufacturer. These models may even be configured with respect to a particular region. Keeping configuration rules for network security and other aspects of the operation up to date on an automobile can thus be vulnerable to network transport.

What is needed is a robust technique for securely updating computer configuration files of a specific automobile type and a specific automobile.

SUMMARY

To meet the above-described needs, methods, computer program products, and systems for securely updating computer configuration files of a specific automobile type and a specific automobile.

In one embodiment, a three-level configuration mechanism to configure/update the mass vehicles, is set forth, using a signed configuration mechanism certificate/signature/configuration to prevent tampering.

In another embodiment, configuration files and updates to configuration files from automobile manufacturer are stored in a database. Certificates are also stored for each individual automobile generated from a unique Vehicle Identification Number (VIN) of a specific automobile along with an IP associated with the specific automobile.

In yet another embodiment, a request to check for updated configuration files for a specific automobile and a specific automobile type is received in real-time over the data communication network. Comparing a checksum of received request against stored configuration file, checks for an update. If there is an update, a signature is generated using the certificate from the unique VIN number portion and the stored configuration file for encrypting the stored configuration file. The signature and stored configuration file is transmitted to the specific automobile for local configuration update.

Advantageously, computer devices for automobiles are improved with better security.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for securely updating configuration files of a specific automobile type and a specific automobile. The following disclosure is limited only for the purpose of conciseness, as one of ordinary skill in the art will recognize additional embodiments given the ones described herein.

I. Systems for Securely Updating Automotive Computer Configuration Files (FIGS. 1-3)

Figure 1:
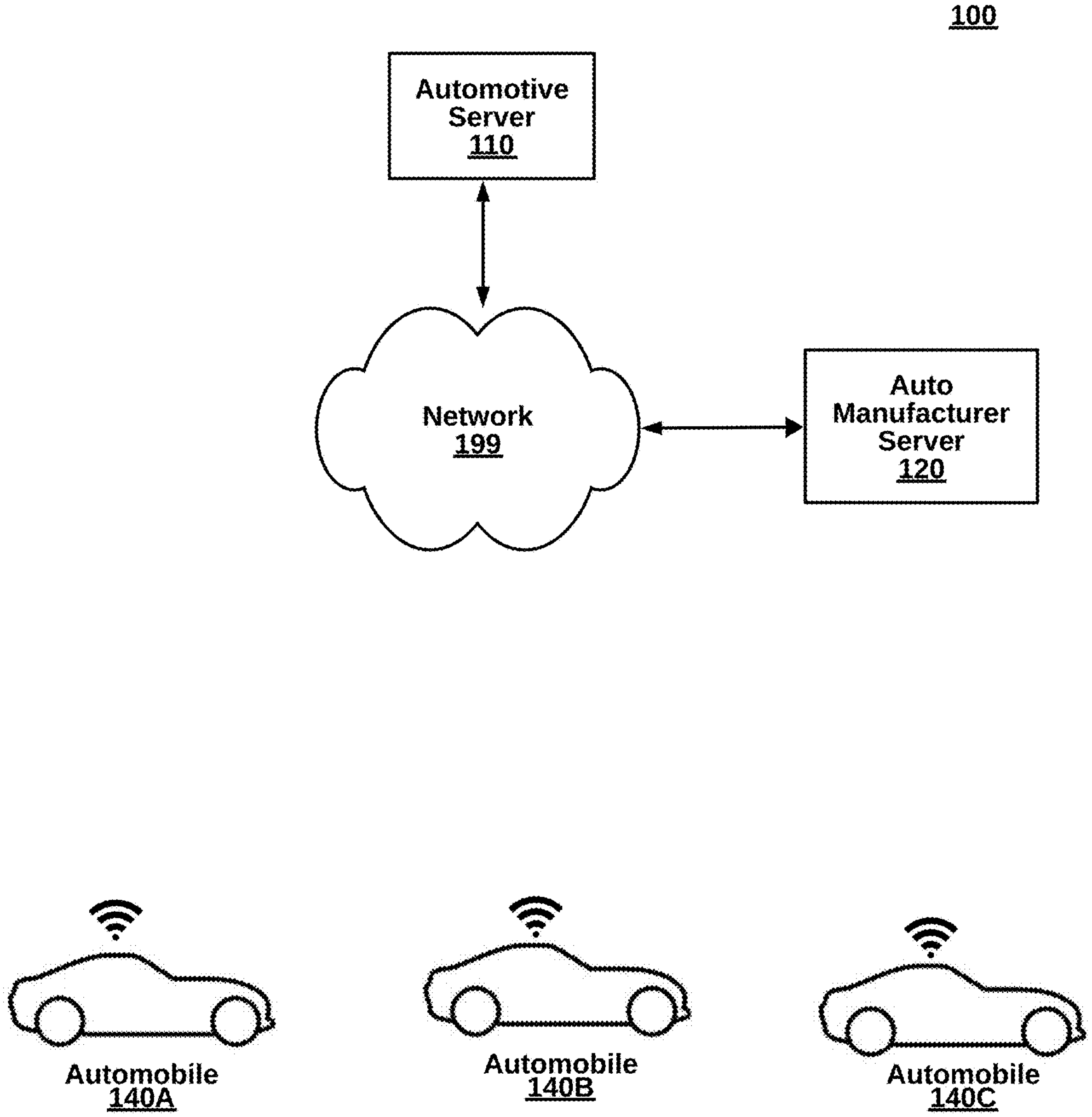
FIG. 1 is a high-level block diagram illustrating aspects of a system for securely updating configuration files of a specific automobile type and a specific automobile, according to some embodiments.
Figure 2:
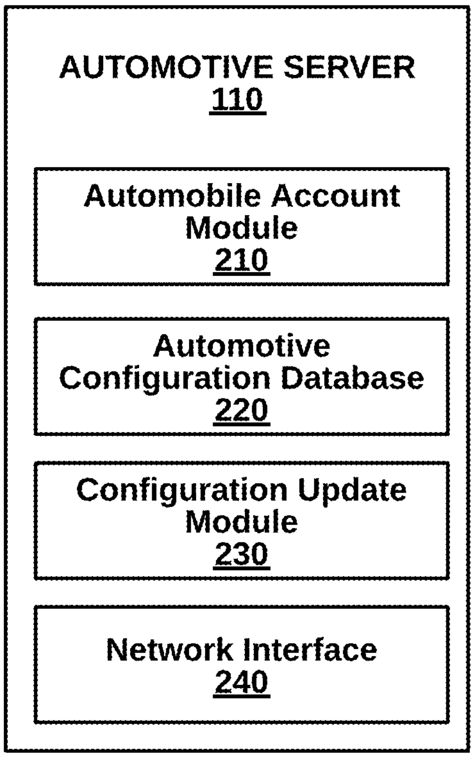
FIG. 2 is a more detailed block diagram illustrating an automotive server of the system of FIG. 1, according to one embodiment.
Figure 6:
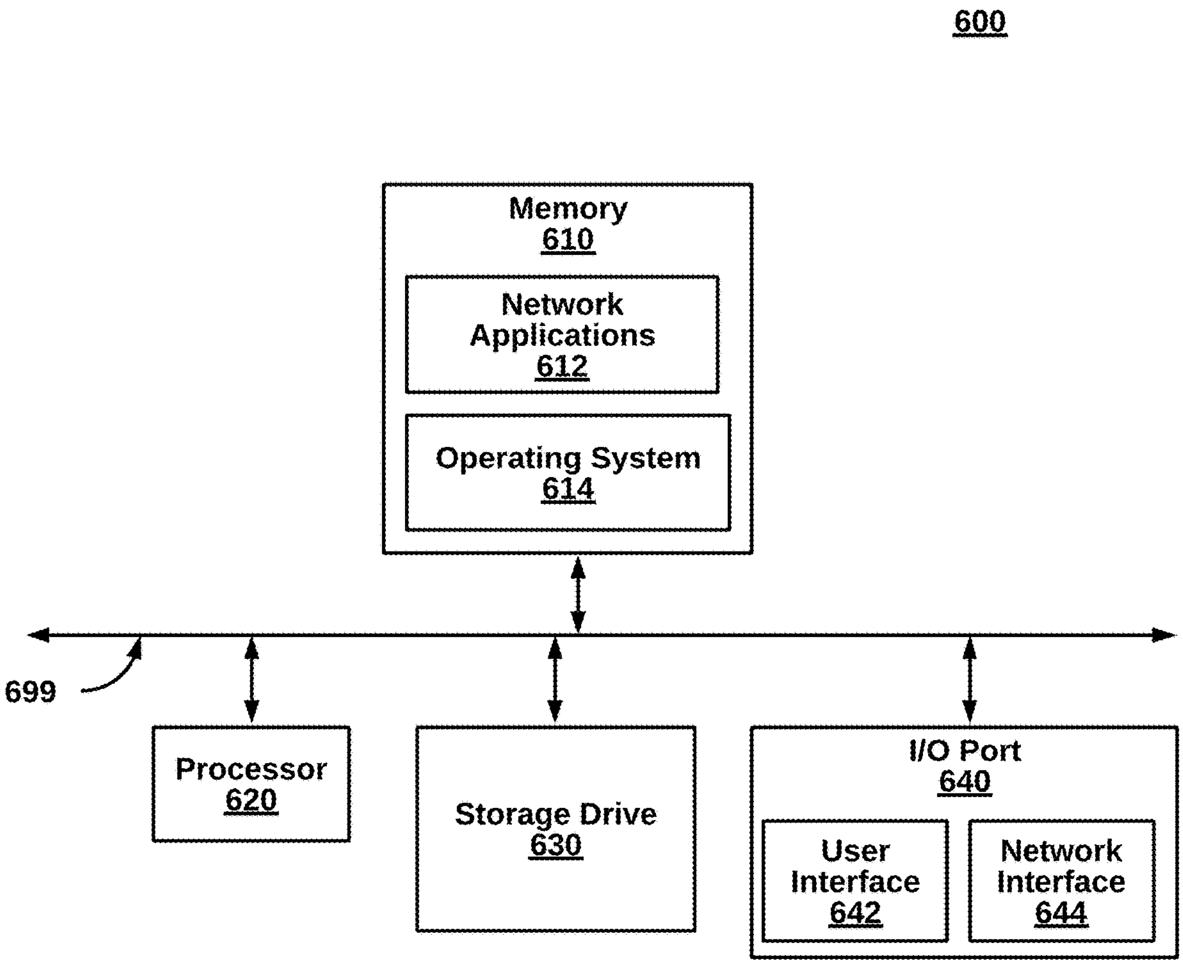
FIG. 6 is a block diagram illustrating an example computing device for the system of FIG. 1, according to one embodiment.

FIG. 1 is a high-level block diagram illustrating a system 100 for securely updating configuration files of a specific automobile type and a specific automobile, according to an embodiment. The system 100 includes an enterprise network with an automotive server 110, a manufacturer server 120, and automobiles 140A-C. Other embodiments of the system 100 can include additional components that are not shown in FIG. 1, such as routers, switches, network gateways, and firewalls, as well as additional access points and stations are also possible. For example, the system 100 of FIG. 1 shows one station and three access points, however, other examples have hundreds of stations connected to access points distributed over different computer networks. The components of system 100 can be implemented in hardware, software, or a combination of both. An example implementation is shown in FIG. 6.

In one embodiment, the components of the system 100 are coupled in communication over a private network connected to a public network, such as the Internet. In another embodiment, system 100 is an isolated, private network, or alternatively, a set of geographically dispersed LANs. The components can be connected to the data communication system 199 via hard wire (e.g., automotive server 110). The components can also be connected via wireless networking (e.g., automobiles 140A-C). The data communication network 199 can be composed of any combination of hybrid networks, such as an SD-WAN, an SDN (Software Defined Network), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802, 11r, 802.11be, Wi-Fi 6, Wi-Fi 6E, Wi-Fi 7 and the like. Components can use IPV4 or Ipv6 address spaces.

Figure 3A:
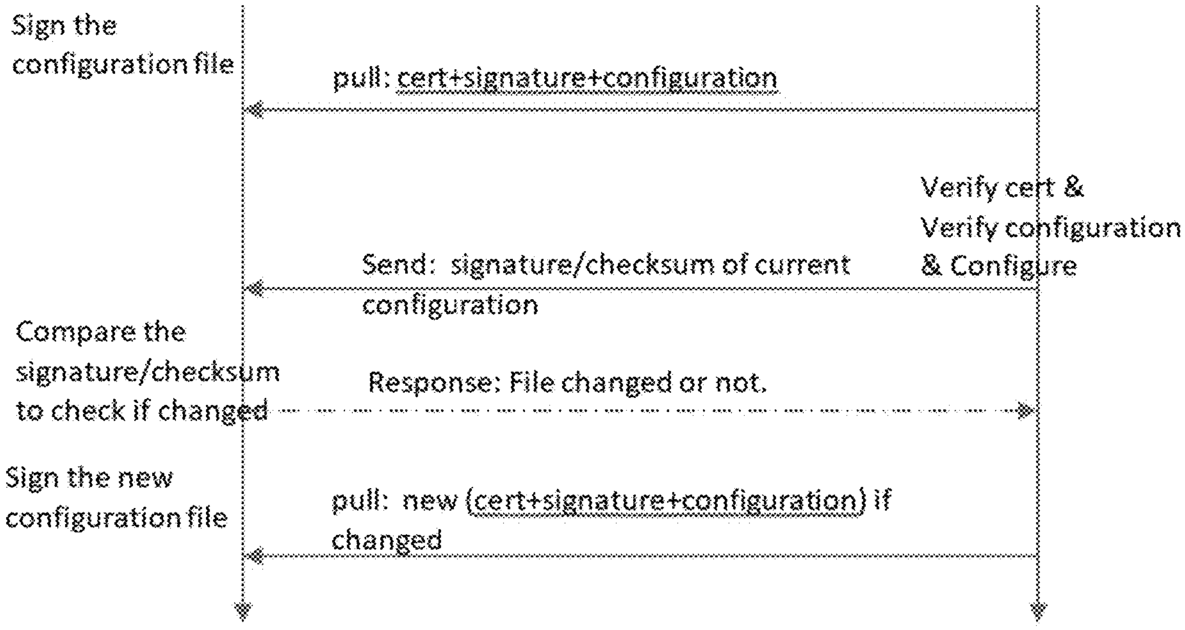
FIGS. 3A and 3B are schematic diagrams illustrating how components of the system interoperate to form a configuration file and transmit to an automobile, according to one embodiment.
Figure 3B:
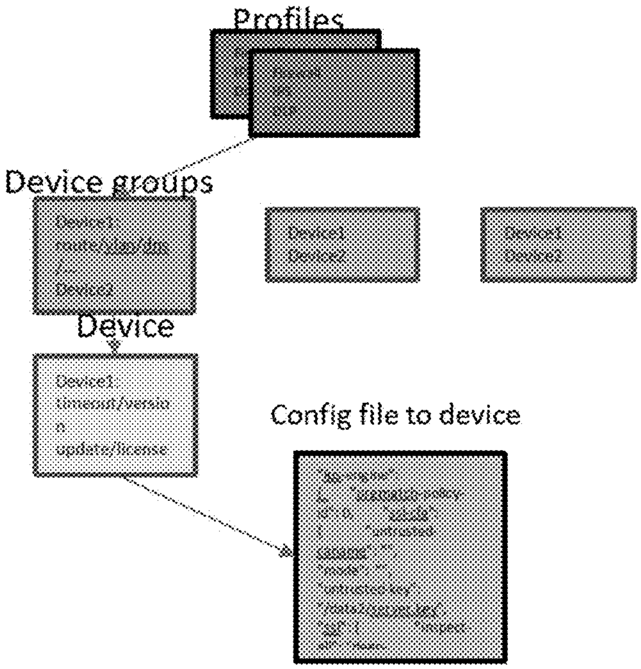

One embodiment of the system 100 in operation is described in the following non-limiting example, as illustrated in FIGS. 3A and 3B.

A three-level configuration mechanism configures and updates mass vehicles. A signed configuration mechanism of certificate, signature and configuration prevents tampering.

In one embodiment, the automobiles 140A-C are gas or electric-powered vehicles (e.g., car, truck, SUV, motorcycle, or scooter), driven by humans or computers, with a computer system that is integral to operation of the vehicle. A non-limiting example of manufacturers includes Ford, Chevrolet, Tesla, Jeep, Toyota and Honda. Vehicles may also be identified as part of a specific fleet with custom updates, such as a school bus fleet, a military fleet, a post office fleet, a rental fleet, a trucking company, or the like.

The automobile 140A (or any automobile) can pull configuration (with signature and certificate) from the automotive server 110, in one embodiment. The automotive server 110 can push configuration, in another embodiment. For security, the automotive server 110 uses private key to sign the configuration file, and the automobile 140A uses a certificate to verify the configuration file (to avoid the configuration file being tampered with). The configuration update occurs when the associated configuration has been updated on the automotive server 110. In one case, the automobile 140A periodically pushes signature/checksum to the automotive server 110, for comparing this signature/checksum with current configuration's signature/checksum. If changed, the automobile 140A proceeds to update its configuration.

An implementation of a three-level configuration includes a device level configuration, a device group and a profile. Device level configuration can include connection timeout/Update control/license. A device group can be used to group cars. The automobile 140A can be classified into a group, and car can be adjusted to other groups at any time (the cars at same group will have the same external interfaces, such as the same network interface), and device group has device level configuration, such as vlan/dns/route. Using configuration profile, each profile has a complete security configuration (as template), such as configure ips/ids/dlp/application control/firewall etc. Each device group can choose to apply a certain profile, and then the profile+device group+device configuration will be rendered into a complete configuration (file) for this device. In an embodiment, the complete configuration is stored as a unified configuration format, such as Json/xml.

The automobile 140A will periodically send its configuration file's checksum/signature to admin server, server will compare it with current checksum/signature to verify if it is changed, and update the configuration status.

When the automotive server 110 finds out configuration changed, it will set this configuration status as changed. The automobile 140A can query the configuration status, if configuration changed, it will pull the latest file from the automotive server 110.

For user device group to group automobiles, a automobile can be classified into a group and be adjusted to other groups at any time (the same group will have the same external interface, such as the same net card interface name), at device group, related configuration can be devised, such as vlan/dns/route.

Each configuration profile can be a complete configuration (template). It can configure security policy (ips/application control/dlp/anti-malware)/firewall, etc.). Each device group can choose to apply a certain profile, and then the profile render (rendering, mainly to replace the network interface called by the profile with its own specific device interface) into its own configuration (file); then mark the configuration file to be updated.

The automotive server 110 uses a certificate to encrypt/signature the configuration file, generate a signature, combine the configuration and signature and certificate into the configuration file. The automobile 140A uses the certificate to signature the configuration file and get the new signature, then compare it with the signature which recorded in the configuration file. If these two signatures are different, it means this configuration file was tampered, so the automobile 140A will not use this configuration. If these two signatures are equal, it is a reliable configuration and the automobile will configure according this configuration.

Finally, the automobile 140A configuration updates according to the configuration file, in an embodiment.

The automotive server 110 provides configuration updates for a variety of automobiles manufacturers (e.g., Tesla, Chevy, Harley Davidson) and specific models. The automobiles 140A-C can all be associated with the same automotive serve 110 or different ones. In operation, the automotive server 110 domain name and/or IP address is configured in the automobile 140A. The automotive server 110 can sign the configuration, the configuration and signature and certificate can then be combined into the configuration file.

The automobile 140A can be continuously connected to data service using cell data service. Alternatively, the automobile 140A can connect to nearby access points over wireless channels for uploading and downloading data from the data communication network. Each automobile 140A-C has a unique VIN for physical identification. The VIN can also be programmed digitally within the electronics system. Within the VIN, the first character can indicate where the automobile was build, the second and third characters can indicate the manufacturer, the fourth and eighth characters can indicate a portrait of the vehicle brand, engine size and type, the ninth character can indicate a security code, the tenth character can indicate a module year, the eleventh character can indicate which plant assembled the vehicle, and the last six characters can be a serial number of the vehicle. Thus, by parsing the VIN number, many aspects of automobiles can be determined when matching with a correct configuration file.

FIG. 2 is a more detailed block diagram illustrating the automotive server 110 of the system of FIG. 1, according to one embodiment. The automotive server 110 includes an automobile account module 210, an automotive configuration database 220, a configuration update module 230 and a network interface 240. The components can be implemented in hardware, software, or a combination of both.

The automobile account module 210 stores certificates for each individual automobile generated from a unique VIN number portion of a specific automobile along with an IP associated with the specific automobile. This can be set up at manufacture or update later by an owner.

The automotive configuration database 220 stores configuration files and updates to configuration files from the automobile manufacturer server. In one case, automobile manufacturers have a direct relationship and releases updates through the automotive database 220, over trusted connections. In another case, third-party manufacturers can update individual components of configurations across different automobile types and modules, for example, for a braking system in common. In still another case, a third-party service collects or produces configuration updates to the automotive configuration database 220.

The configuration update module 230 receives, in real-time over the data communication network, a request to check for updated configuration files for a specific automobile and a specific automobile type. A checksum of received request is compared against stored configuration file to check for an update. If updated, a signature is generated using the certificate from the unique VIN number portion and the stored configuration file for encrypting the stored configuration file.

The network interface 240 transmits signature and stored configuration file to the specific automobile for local configuration update. A transmitter and antennae can interface with wireless channels while an Ethernet port, for example, can interface with wired channels.

II. Methods for Securely Updating Automotive Computer Configuration Files (FIGS. 4-5)

Figure 4:
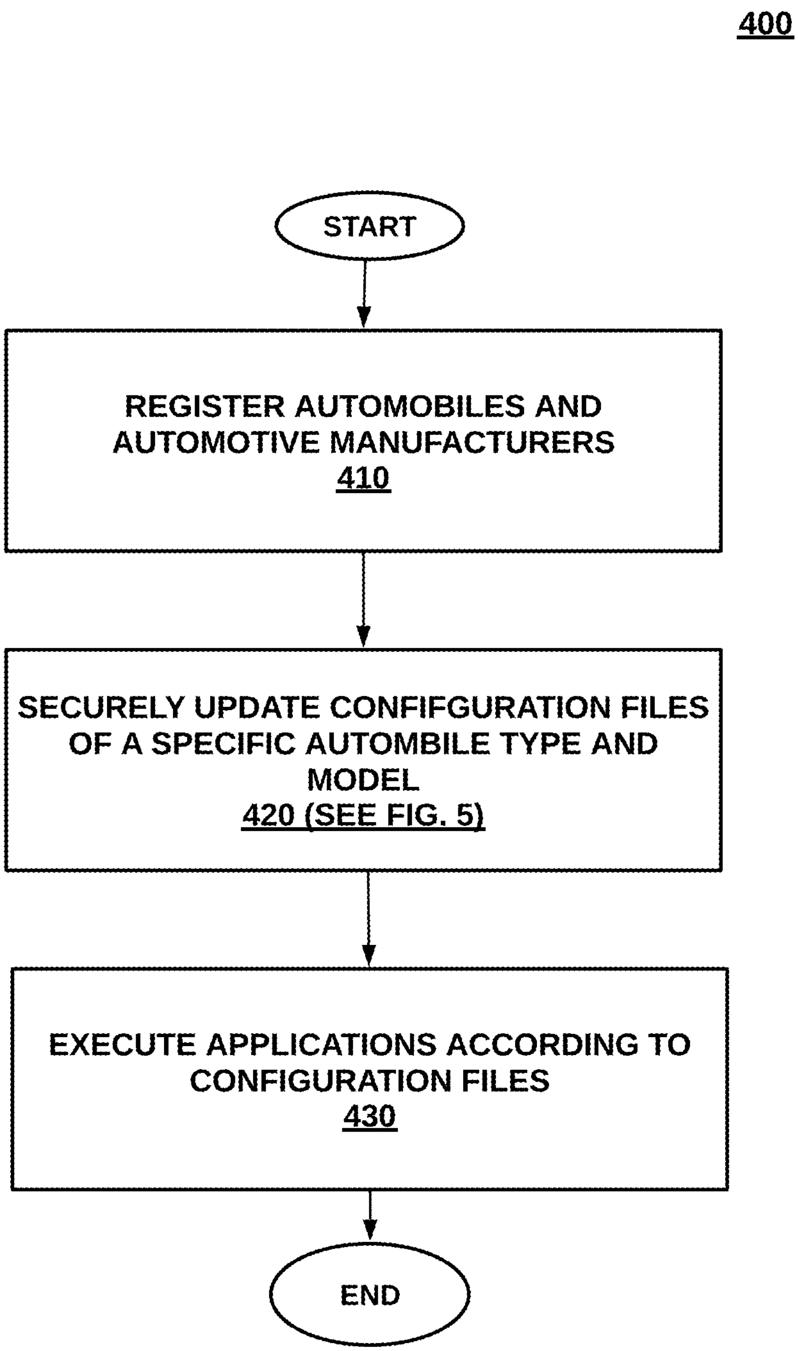
FIG. 4 is a high-level flow diagram illustrating a method for securely updating configuration files of a specific automobile type and a specific automobile, according to an embodiment.

FIG. 4 is a high-level flow diagram of a method 400 for updating automotive configuration files. The method 400 can be implemented by, for example, system 100 of FIG. 1. The specific grouping of functionalities and order of steps are a mere example as many other variations of method 400 are possible, within the spirit of the present disclosure. Other variations are possible for different implementations.

At step 410, automobiles and automotive manufacturers are registered. For automobiles, storing certificates for each individual automobile generated from a unique VIN number portion of a specific automobile along with an IP associated with the specific automobile. For manufacturers, configuration files and updates to configuration files from automobile manufacturer. At step 420, automobile configurations files are securely updated, as described in more detail below in association with FIG. 5. At step 430, automobiles execute applications according to configuration files during operation.

Figure 5:
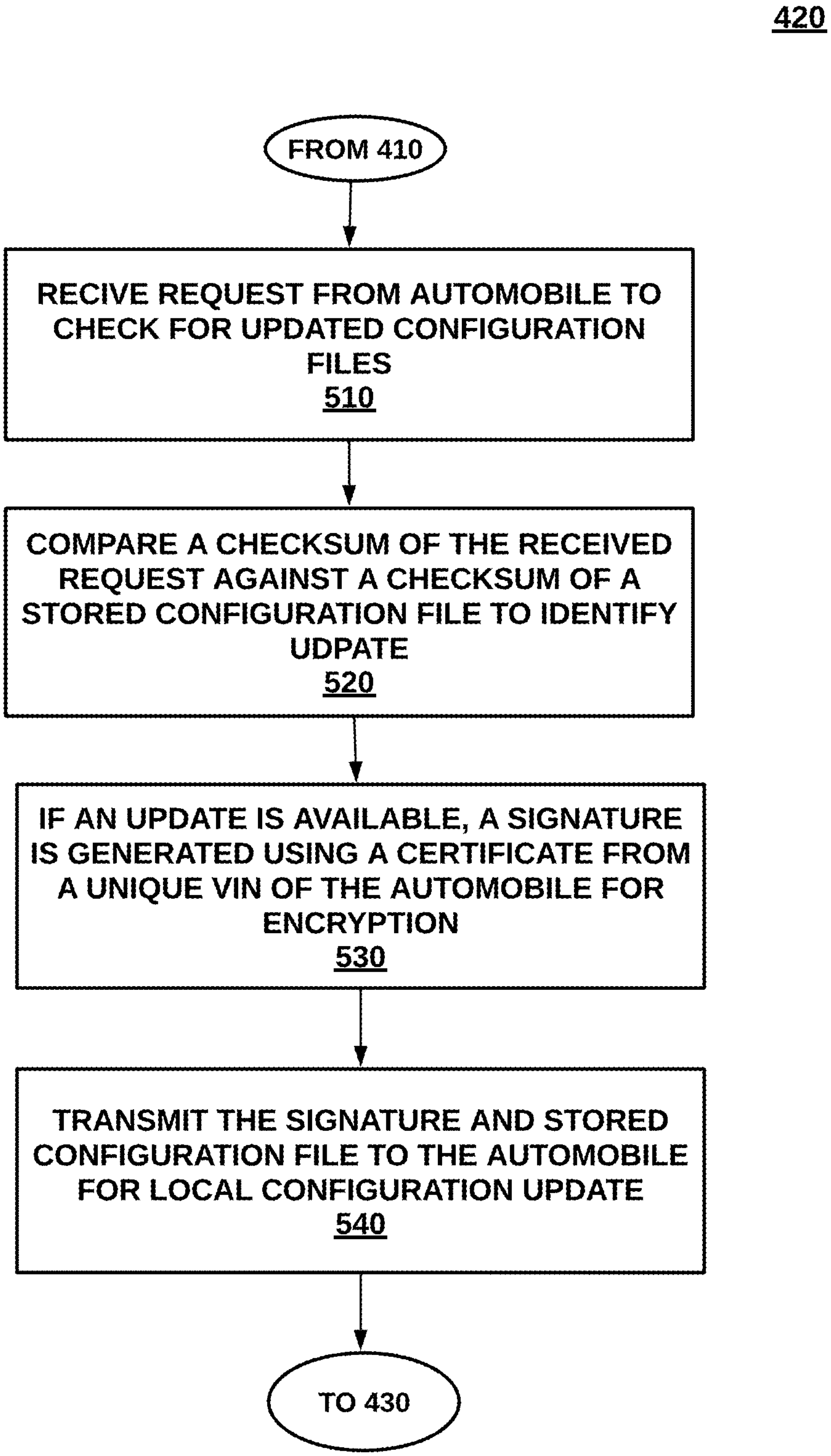
FIG. 5 is a more detailed flow diagram illustrating a step for securely updating configuration files of a specific automobile type and a specific automobile, from the method of FIG. 4, according to one embodiment.

FIG. 5 is a more detailed flow diagram detailing the step 420 of securely updating configuration files of a specific automobile type and a specific automobile model, according to an embodiment.

Specifically, at step 510, a request to check for updated configuration files for a specific automobile and a specific automobile type is received. At step 520, a checksum of received request is compared against stored configuration file to check for an update. At step 530, if update, a signature is generated using the certificate from the unique VIN number portion and the stored configuration file for encrypting the stored configuration file. At step 540, signature and stored configuration file are transmitted to the specific automobile for local configuration update.

III. Computing Device for Securely Updating Automotive Computer Configuration Files (FIG. 6)

FIG. 6 is a block diagram illustrating a computing device 600 for use in the system 100 of FIG. 1, according to one embodiment. The computing device 600 is a non-limiting example device for implementing each of the components of the system 100, including the automotive server 110 and automobiles 140A-C. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 can be a storage device such as HDD, SDD, removable disk (e.g., SD card) and further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase network appliance generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in an automotive server for securely updating computer configuration files of a specific automobile type and a specific automobile, the method comprising:

storing configuration files and updates to configuration files from automobile manufacturers, the configuration files including security configuration profiles;

storing certificates for each individual automobile generated from a unique vehicle identification number (VIN) portion of a specific automobile along with an Internet Protocol associated with the specific automobile;

storing, for the specific automobile, a device-level configuration and a device group configuration, the device group configuration identifying at least one vehicle network interface parameter for a device group to which the specific automobile is assigned;

receiving, in real-time over the data communication network, a request to check for updated configuration files for the specific automobile and the specific automobile type, the request including a checksum or signature associated with a current configuration file stored by the specific automobile;

selecting, by the automotive server, a security-configuration profile for the device group to which the specific automobile is assigned;

rendering, by the automotive server, a complete configuration file for the specific automobile from the selected security-configuration profile, the device-group configuration, and the device-level configuration by replacing a network interface reference of the selected security configuration profile with a vehicle-specific network interface identifier for the specific automobile;

comparing the checksum or signature associated with the current configuration file stored by the specific automobile against a checksum or signature of the complete configuration file to check for an update;

if the update is available, generating a signature using the certificate from the unique VIN portion and the complete configuration file for encrypting the complete configuration file; and transmitting signature and stored configuration file to the specific automobile for local configuration update.

2. A non-transitory computer-readable medium, storing computer-executable instructions, in an automotive server on a data communication network that, wherein executed by a processor, performs a method for securely updating configuration files of a specific automobile type and a specific automobile, the method comprising:

storing configuration files and updates to configuration files from automobile manufacturers, the configuration files including security-configuration profiles;

storing certificates for each individual automobile generated from a unique vehicle identification number (VIN) portion of a specific automobile along with an Internet Protocol associated with the specific automobile;

storing, for the specific automobile, a device-level configuration and a device group configuration, the device group configuration identifying at least one vehicle network-interface parameter for a device group to which the specific automobile is assigned;

receiving, in real-time over the data communication network, a request to check for updated configuration files for the specific automobile and the specific automobile type, the request including a checksum or signature associated with a current configuration file stored by the specific automobile;

selecting, by the automotive server, a security configuration profile for the device group to which the specific automobile is assigned;

rendering, by the automotive server, a complete configuration file for the specific automobile from the selected security configuration profile, the device group configuration, and the device-level configuration by replacing a network interface reference of the selected security configuration profile with a vehicle-specific network-interface identifier for the specific automobile;

comparing the checksum or signature associated with the current configuration file stored by the specific automobile against a checksum or signature of the complete configuration file to check for an update;

if the update is available, generating a signature using the certificate from the unique VIN portion and the complete configuration file for encrypting the complete configuration file; and transmitting signature and stored configuration file to the specific automobile for local configuration update.

3. An automotive server on a data communication network, for securely updating configuration files of a specific automobile type and a specific automobile, the automotive server comprising:

a processor;

a network interface communicatively coupled to the processor and to a data communication network; and a memory, communicatively coupled to the processor and storing:

a first module to store configuration files and updates to configuration files from automobile manufacturers, the configuration files including security-configuration profiles;

a second module to store certificates for each individual automobile generated from a unique vehicle identification number (VIN) portion of a specific automobile along with an Internet Protocol associated with the specific automobile and to store, for the specific automobile, a device-level configuration and a device group configuration, the device group configuration identifying at least one vehicle network interface parameter for a device group to which the specific automobile is assigned; and a third module to receive, in real-time over the data communication network, a request to check for updated configuration files for the specific automobile and the specific automobile type, the request including a checksum or signature associated with a current configuration file stored by the specific automobile, a fourth module to select a security-configuration profile for the device group to which the specific automobile is assigned, the fourth module to render a complete configuration file for the specific automobile from the selected security-configuration profile, the device-group configuration, and the device-level configuration by replacing a network-interface reference of the selected security-configuration profile with a vehicle-specific network-interface identifier for the specific automobile, the fourth module to compare the checksum or signature associated with the current configuration file stored by the specific automobile against a checksum or signature of the complete configuration file to check for an update, if the update is available, the fourth module to generate a signature using the certificate from the unique VIN portion and the complete configuration file for encrypting the complete configuration file, the network interface transmitting signature and stored configuration file to the specific automobile for local configuration update.

* * * * *